(12) United States Patent
Kanazawa et al.

(10) Patent No.: US 9,815,510 B2
(45) Date of Patent: Nov. 14, 2017

(54) CONTROLLER FOR MOBILE ROBOT

(71) Applicants: Honda Motor Co., Ltd., Tokyo (JP); The University of Tokyo, Tokyo (JP)

(72) Inventors: Masao Kanazawa, Saitama (JP); Masayuki Inaba, Tokyo (JP); Kei Okada, Tokyo (JP); Yohei Kakiuchi, Tokyo (JP); Shunichi Nozawa, Tokyo (JP)

(73) Assignees: HONDA MOTOR CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 139 days.

(21) Appl. No.: 14/881,313

(22) Filed: Oct. 13, 2015

(65) Prior Publication Data
US 2016/0107310 A1   Apr. 21, 2016

(30) Foreign Application Priority Data

Oct. 17, 2014 (JP) .................................. 2014-213042

(51) Int. Cl.
*B62D 57/024* (2006.01)

(52) U.S. Cl.
CPC ........... *B62D 57/024* (2013.01); *Y10S 901/01* (2013.01)

(58) Field of Classification Search
CPC ..... B62D 57/024; B62D 57/00; Y10S 901/01; B66B 9/02
USPC ................................................ 700/245–264
See application file for complete search history.

(56) References Cited

U.S. PATENT DOCUMENTS

| 4,637,494 A * | 1/1987 | Iida ...................... B62D 57/00 104/154 |
| 5,213,172 A * | 5/1993 | Paris .................... B62D 57/024 180/8.1 |
| 2002/0120361 A1* | 8/2002 | Kuroki .................. G05B 19/00 700/245 |
| 2009/0166103 A1* | 7/2009 | Bowers ................. A01B 51/02 180/8.1 |

(Continued)

FOREIGN PATENT DOCUMENTS

JP   5221688   6/2013

OTHER PUBLICATIONS

Lu; "Vertical ladder climbing down motion with internal stress adjustment for a multi-locomotion robot"; Micro-NanoMechatronics and Human Science (MHS), 2011 International Symposium on; IEEE, 2011; pp. 403-408.*

(Continued)

*Primary Examiner* — Stephen Holwerda
(74) *Attorney, Agent, or Firm* — Rankin, Hill & Clark LLP

(57) ABSTRACT

A controller 40 for a mobile robot 1 estimates, in a climbing up or down motion of the robot 1, the difference between the actual position and attitude of a distal end portion 13 of a to-be-supported movable link 3 that has been supported by a structure A and the desired position and attitude thereof, and determines a motion target of the robot 1 such that at least either the desired relative position/attitude of the distal end portion 13 of the to-be-supported movable link 3 with respect to a base body 2 or the desired support position/attitude of the distal end portion 13 of a to-be-moved movable link 3, which is to be moved, is adjusted according to the estimated value of the difference.

3 Claims, 5 Drawing Sheets

(56) References Cited

U.S. PATENT DOCUMENTS

2016/0096267 A1* 4/2016 Kaneko ............... B25J 9/1694
180/8.6

OTHER PUBLICATIONS

Yoneda; "Vertical ladder climbing motion with posture control for multi-locomotion robot", Proc. of the 2008 IEEE/RSJ International Conference on Intelligent Robots and Systems; 2008; pp. 3579-3584.*

Lu; "Transition motion from ladder climbing to brachiation for multi-locomotion robot"; Proc. of IEEE Int. Conf. Mechatronics and Automation; 2009; pp. 1916-1921.*

Lu; "Vertical ladder climbing down motion with internal stress adjustment for a multilocomotion robot"; Micro-NanoMechatronics and Human Science (MHS), 2011 International Symposium on; IEEE, 2011; pp. 403-408.*

Lu; "Optimal control of energetically efficient ladder decent motion with internal stress adjustment using key joint method"; Proc. 2012 IEEE/RSJ Int. Conf. Intelligent Robots and Systems; 2012; pp. 2216-2221.*

Noda, et al. "Whole-body Climbing Motion Generation Based on Body Retention Load Index and Decoupling of Physical/Geometrical Posture State Search", No. 13-2 Proceedings of the 2013 JSME Conference on Robotics and Mechatronics, May 22-25, 2013, 4 pages. Discussed in Specification.

\* cited by examiner

FIG.3A
FIG.3B
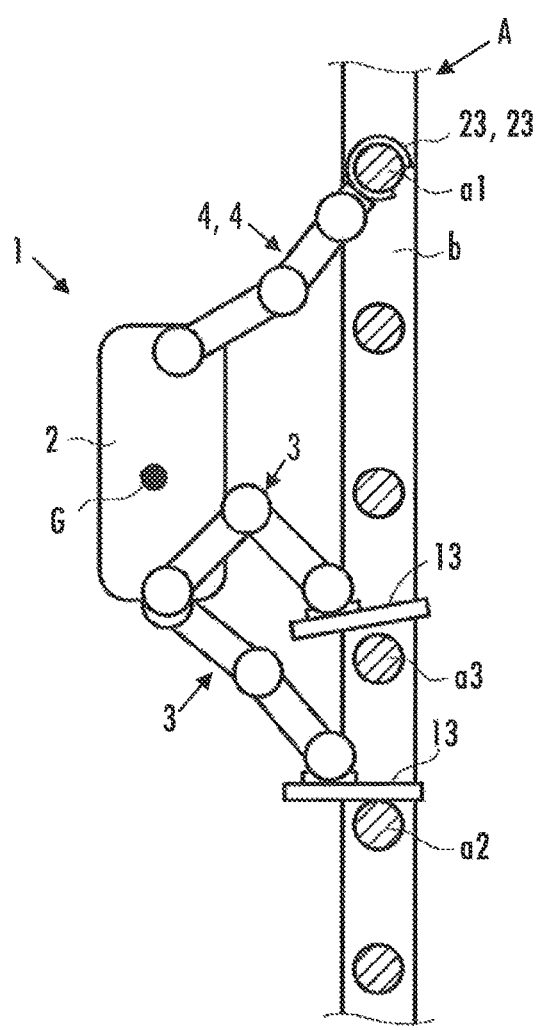
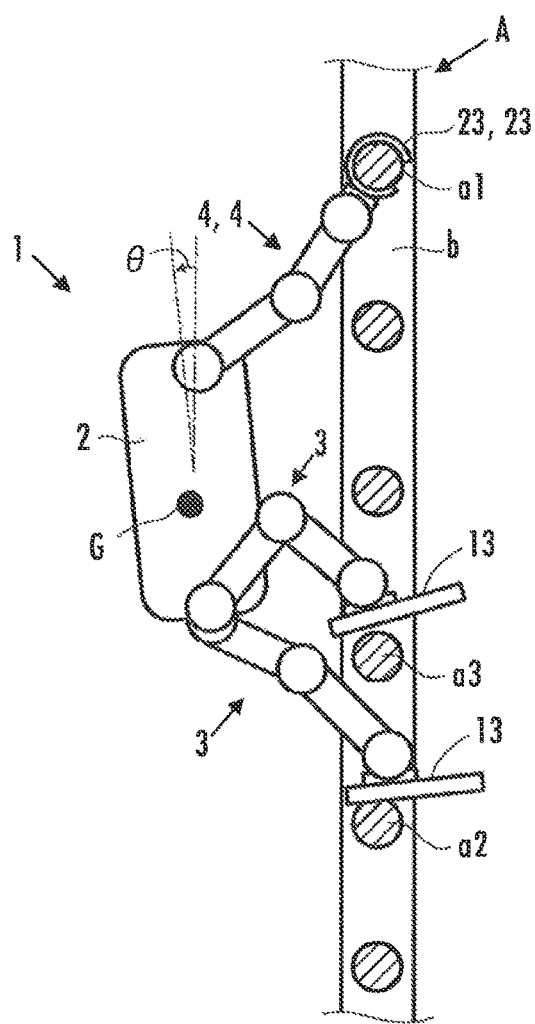

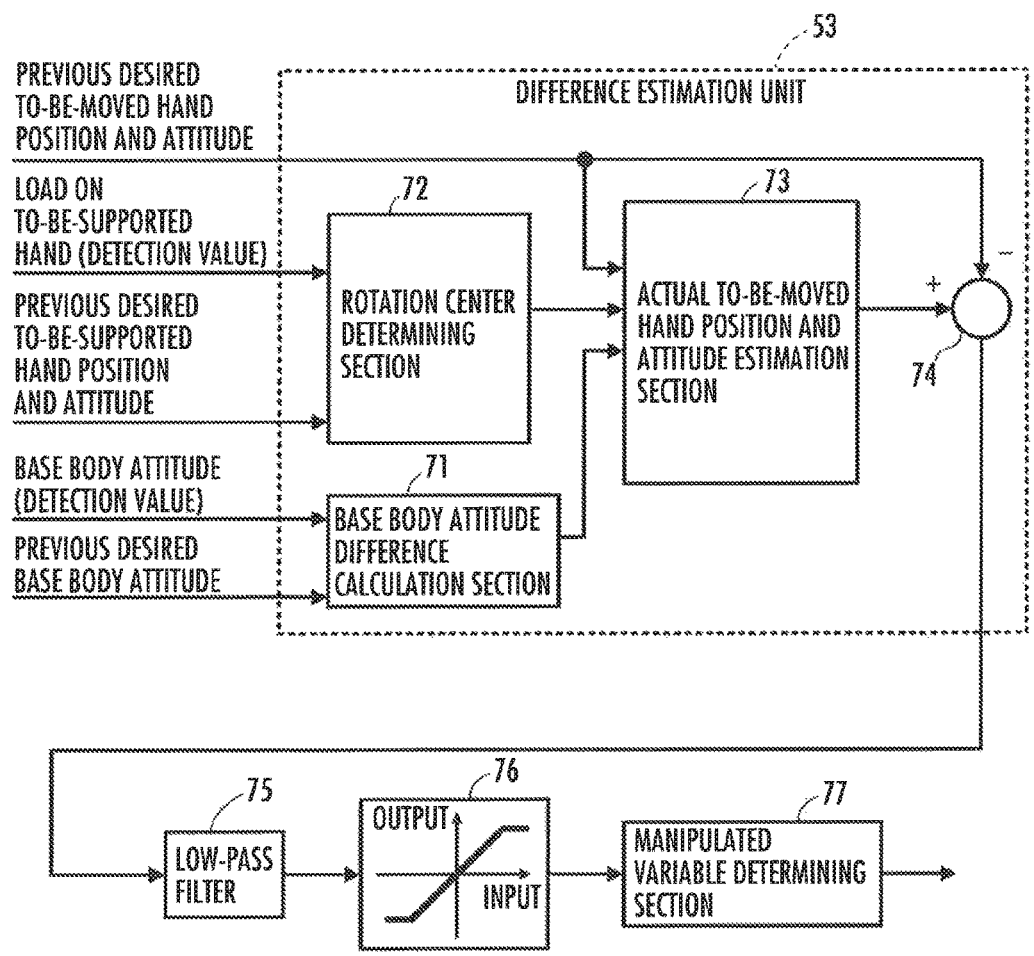

CONTROLLER FOR MOBILE ROBOT

BACKGROUND OF THE INVENTION

1. Field of the Invention

The present invention relates to a controller for a mobile robot having a plurality of movable links extended from a base body.

2. Description of the Related Art

As a mobile robot having a plurality of movable links extended from a base body thereof, there has conventionally been known in general a humanoid robot provided with two leg links and two arm links as movable links, as described in, for example, Japanese Patent No. 5221688 (hereinafter referred to as "Patent Document 1").

To have this type of a mobile robot perform a task at a height, it is necessary to have the mobile robot climb up and down a structure having a steep slope, such as a ladder or a stepladder (hereinafter referred to as "a steep-slope structure" in some cases).

Hence, in recent years, the research on the technology for enabling a humanoid robot to climb up and down a steep-slope structure, such as a stepladder, has been proceeding, as described in, for example, "Whole-body Climbing Motion Generation based on Body Retention Load Index and Decoupling of Physical/Geometrical Posture State Search" by Shintaro NODA, Shunnichi NOZAWA, Masaki MUROOKA, Kei OKADA, and Masayuki INABA (No. 13-2 Proceedings of the 2013 JSME Conference on Robotics and Mechatronics, Tsukuba, Japan, May 22-25, 2013/2P1-B03) (hereinafter referred to as "non-patent document 1).

To have a mobile robot, such as a humanoid robot, climb up or down a steep-slope structure, such as a ladder or a stepladder, a climbing up or down motion described below is carried out. A distal end portion of an upper movable link to be supported, which is extended from an upper portion of a base body (the distal end portion being, for example, a hand of an arm link), and a distal end portion of a lower movable link to be supported, which is extended from a lower portion of the base body (the distal end portion being, for example, a foot of a leg link), are brought into contact with the steep-slope structure thereby to support the distal end portions, and a distal end portion or portions of one or more movable links to be moved, which are different from the upper movable link to be supported and the lower movable link to be supported (e.g., one or both of other arm link and leg link), are positioned away from the steep-slope structure. In this state, the distal end portion or portions of the movable link or links are moved toward desired support position or positions and attitude or attitudes, and then the distal end portion or portions of the movable link or links to be moved are brought into contact with the steep-slope structure at the desired support position or positions and attitude or attitudes, thereby supporting the distal end portion or portions.

When the mobile robot climbs up or down the steep-slope structure, the whole center of gravity of the mobile robot normally lies at a position laterally away from the steep-slope structure. Hence, a moment (mostly a moment in the pitch direction) attributable to a gravitational force tends to act on the mobile robot.

Thus, during the execution of the climbing up or down motion, the distal end portions of the movable links supported by the steep-slope structure frequently slip. This in turn causes the actual attitude of the base body of the mobile robot to be displaced from a desired, intended attitude in many cases.

In such a case, the interference is likely to occur between a middle portion of the lower movable link to be supported, which is supported by the steep-slope structure, or a movable link to be moved (especially a movable link to be moved, which is extended from the lower portion of the base body), and the steep-slope structure. There is another possibility that the distal end portion of the movable link to be moved cannot be properly supported at the desired support position and attitude by the steep-slope structure (e.g., the distal end portion of a leg link missing a rung).

SUMMARY OF THE INVENTION

The present invention has been made in view of the background described above, and an object of the invention is to provide a controller that enables a mobile robot to perform a motion that makes it possible to avoid the interference or the like between a movable link and a structure, such as a ladder or a stepladder, when having the mobile robot climb up or down the structure.

To this end, a controller for a mobile robot in accordance with the present invention is a controller for a mobile robot, which has a base body and a plurality of movable links extended from the base body and which is configured such that a distal end portion of each of the movable links is moved with respect to the base body by a motion of a joint provided between a distal end portion of each of the movable links and the base body, the controller including:

a motion target determining unit, which sequentially determines, in the case where the mobile robot climbs up or down a structure to be climbed up or down, a motion target that defines the motion of each joint of the mobile robot so as to include a climbing up and down motion in which distal end portions of upper movable links to be supported, which are one or more movable links extended from an upper portion of the base body among the plurality of movable links and distal end portions of lower movable links to be supported, which are one or more movable links extended from a lower portion of the base body are brought into contact with the structure thereby to be supported, and in a state wherein distal end portions of movable links to be moved, which are one or more movable links other than the upper movable links to be supported and the lower movable links to be supported, are positioned away from the structure, the distal end portion of each of the movable links to be moved is moved toward desired support position and attitude to bring the distal end portion of the movable link to be moved into contact with the structure at the desired support position and attitude thereby supporting the distal end portion;

a joint control unit that controls the motion of each joint of the mobile robot according to the determined motion target; and a difference estimation unit which estimates at least one of a position and attitude difference, which is a difference between actual position and attitude of a distal end portion of each of one or more lower movable links to be supported in the climbing up or down motion of the mobile robot and desired position and attitude of the distal end portion of the lower movable link to be supported in the motion target, and a position and attitude difference, which is a difference between actual position and attitude of a distal end portion of each of one or more movable links to be moved in the climbing up or down motion of the mobile robot and desired position and attitude of the distal end portion of the movable link to be moved in the motion target;

wherein the motion target determining unit is configured to determine the motion target such that, at the time of sequentially determining the motion target in the climbing up or down motion of the mobile robot, at least one of desired relative position/attitude of the distal end portion of each of one or more lower movable links to be supported with respect to the base body and desired support position/attitude at which the distal end portion of each of one or more movable links to be moved is to be supported by the structure is adjusted according to the estimated position and attitude difference (a first aspect of the invention).

In the present invention, the term "position and attitude" means a set of position and attitude. Further, the term "position/attitude" means at least one of position and attitude (in other words, either one or both of position and attitude).

In the climbing up or down motion of the mobile robot, a moment attributable to the gravitational force acting on the mobile robot tends to act on the mobile robot, so that the distal end portion of the lower movable link to be supported or the distal end portion of the upper movable link to be supported, which is supported by the structure, is prone to slip.

If such a slippage occurs, then the position and attitude difference on the distal end portion of the lower movable link to be supported or the movable link to be moved occurs (the difference on at least one of position and attitude being non-zero), and the position and attitude difference is estimated by the difference estimation unit.

Further, when sequentially determining the motion target in the climbing up or down motion of the mobile robot, the motion target determining unit determines the motion target such that at least one of the desired relative position/attitude of the distal end portion of each of one or more lower movable links to be supported with respect to the base body and the desired support position/attitude at which the distal end portion of each of one or more movable links to be moved is to be supported by the structure is adjusted according to the estimated position and attitude difference.

In this case, adjusting the desired relative position/attitude of the distal end portion of each of the one or more lower movable links to be supported with respect to the base body consequently makes it possible to adjust the position/attitude of the base body with respect to the structure. This in turn makes it possible to prevent the position/attitude of the base body with respect to the structure from deviating from intended proper position/attitude.

Further, adjusting the desired support position/attitude at which the distal end portion of each of the one or more movable links to be moved is to be supported by the structure makes it possible to prevent the distal end portion of each of the movable links to be moved from being supported by the structure at position/attitude deviating from intended proper support position/attitude relative to the structure or to prevent the distal end portion of each of the movable links to be moved from being not in contact with the structure when the distal end portion reaches the desired support position/attitude. Further, it is also possible to prevent a movement trajectory for the distal end portion of each of the movable links to be moved to reach the desired support position/attitude from deviating from an intended proper trajectory.

According to the first aspect of the invention, therefore, when having the mobile robot climb up or down a structure, such as a ladder or a stepladder, the mobile robot is enabled to move, avoiding the interference or the like between the movable links and the structure.

According to the first aspect of the invention, the difference estimation unit is capable of estimating the position and attitude difference by a variety of techniques.

For example, in the case where the mobile robot includes an attitude sensor that generates an output based on the attitude of the base body of the mobile robot, the difference estimation unit may be configured to include a function for estimating, as actual position and attitude of the distal end portion of each of the lower movable links to be supported or the distal end portion of each of the movable links to be moved, the position and attitude of the distal end portion of each of the lower movable links to be supported of the mobile robot or the distal end portion of each of the movable links to be moved thereof which is obtained by virtually rotating the mobile robot of the motion target, using as the center of rotation an action center point of overall load applied from the structure to the distal end portion of each of the upper movable links to be supported by a difference between a detection value of the attitude of the base body indicated by an output of the attitude sensor and a desired value of the attitude of the base body in the motion target (a second aspect of the invention).

In the climbing up or down motion of the mobile robot, if the slippage of the distal end portions of the lower movable links to be supported that is supported by the structure or the distal end portions of the upper movable links to be supported occurs according to the moment acting on the mobile robot due to the gravitational force, the mobile robot can recognize the occurrence of the slippage of the distal end portions of the lower movable links to be supported or the distal end portions of the upper movable links to be supported, by the rotation using as the center of rotation the center point of the overall load applied from the structure to the distal end portion of each of the upper movable links to be supported.

Further, the amount of rotation of the mobile robot in the above case agrees or substantially agrees with the difference between a detection value of the attitude of the base body, which is indicated by an output of the attitude sensor, and the desired value of the attitude of the base body in the motion target.

Thus, according to the second aspect of the invention, the difference estimation unit estimates the actual positions and attitudes of the distal end portions of the lower movable links to be supported or the distal end portions of the movable links to be moved. In this case, the position and attitude difference can be estimated from the estimated values of the actual positions and attitudes of the distal end portions of the lower movable links to be supported or the distal end portions of the movable links to be moved and the desired positions and attitudes.

Thus, the second aspect of the invention makes it possible to properly estimate the actual position and attitude of the distal end portion of each of the lower movable links to be supported or the distal end portion of each of the movable links to be moved, which are necessary to estimate the position and attitude difference, by using an output of the attitude sensor.

The position of the action center point of the overall load applied from the structure to the distal end portion of each of the upper movable links to be supported, i.e., the position of the center of rotation, may be identified by any technique. For example, if each of the upper movable links to be supported is provided with a force sensor (e.g., a six-axis force sensor), which generates an output based on the load applied to the distal end portion of each of the upper movable links to be supported, then the position of the action center point, i.e., the center of rotation, can be identified on the basis of an output of the force sensor.

Supplementarily, the technique for estimating the actual position and attitude of the distal end portion of each of the lower movable links to be supported or the distal end portion of each of the movable links to be moved, which are necessary for estimating the position and attitude difference is not limited to the foregoing technique in the second aspect of the invention. For example, if each of the lower movable links to be supported is provided with a force sensor (e.g., a six-axis force sensor), which generates an output based on the load applied to the distal end portion of each of the lower movable links to be supported, then the actual position and attitude of the distal end portion of each of the lower movable links to be supported can be estimated on the basis of an output of the force sensor.

Further, based on, for example, the estimated values of the actual position and attitude of the distal end portion of one of the lower movable links to be supported and a detection value of the amount of displacement of each joint of the mobile robot, it is also possible to estimate the actual position and attitude of the distal end portion of each of the movable links to be moved or the distal end portion of the other lower movable link to be supported.

According to the first aspect or the second aspect of the invention, the mobile robot has two or more movable links extended from the lower portion of the base body and two or more movable links extended from the upper portion of the base body, and the first or the second aspect of the invention is ideally suited in the case where the climbing up or down motion is a climbing up or down motion in which some movable links among the movable links extended from the lower portion of the base body are defined as the lower movable links to be supported, the remaining movable links among the movable links extended from the lower portion of the base body are defined as the movable links to be moved, and at least one movable link among the movable links extended from the upper portion of the base body is defined as the upper movable link to be supported, and the distal end portions of the movable links to be moved are moved (a third aspect of the invention).

In other words, in the climbing up or down motion according to the third aspect of the invention, only some movable links among the movable links extended from the lower portion of the base body become the lower movable links to be supported, so that the distal end portions of the lower movable links to be supported are apt to slip.

The foregoing phrase "some movable links" means the movable links in a quantity (one or plural) that is smaller than the total quantity of the movable links extended from the lower portion of the base body.

However, the motion target determining unit determines a motion target as described in relation to the first aspect of the invention, thus making it possible to carry out with high reliability the motion of the mobile robot, i.e., climbing up or down a structure, avoiding the interference or the like between the movable links and the structure.

In the third aspect of the invention, the motion target determining unit is preferably configured such that, in the case where the estimated position and attitude difference is a difference caused by the attitude of the base body inclined to bring the lower portion of the base body close to the structure, desired relative position/attitude of the distal end portion of the lower movable link to be supported with respect to the base body is adjusted such that a distance between a part of each one or more lower movable links to be supported among the movable links extended from the lower portion of the base body, which part being connected to the base body, and the distal end portion of the lower movable link to be supported is longer than that in the case where the position and attitude difference is zero, and the desired support position/attitude of the distal end portion of each of the one or more movable links to be moved among the movable links extended from the lower portion of the base body are adjusted such that the desired support position/attitude are brought closer to the base body than in the case where the position and attitude difference is zero (a fourth aspect of the invention).

The case where the position and attitude difference is zero means that the differences in the position and the attitude on all movable links (the lower movable links to be supported or the movable links to be moved) estimated by the difference estimation unit are all zero.

According to the fourth aspect of the invention, the lower portion of the base body is moved in a direction away from the structure by adjusting the desired relative position/attitude of the distal end portion of the lower movable link to be supported with respect to the base body as described above, thus making it possible to bring the attitude of the base body with respect to the structure close to an intended proper attitude.

Further, the desired support position/attitude of the distal end portion of each of the movable links to be moved, which are extended from the lower portion of the base body, is adjusted so as to make it possible to bring the position/attitude of the distal end portion of the movable link to be moved close to an intended proper position/attitude when the distal end portion reaches the structure. It is also possible to prevent the movement trajectory of the distal end portion of the movable link to be moved, along which the distal end portion traces until reaching the structure, from becoming excessively close to the structure.

Thus, the interference or the like between the movable links and the structure can be properly avoided with high reliability.

BRIEF DESCRIPTION OF THE DRAWINGS

FIG. 3A and FIG. 3B are diagrams illustrating an example mode of the climbing up or down motion of the mobile robot according to the embodiment;

FIG. 5 is another block diagram illustrating the major processing carried out by the motion target determining unit illustrated in FIG. 2.

DESCRIPTION OF THE PREFERRED EMBODIMENTS

An embodiment of the present invention will be described below with reference to FIG. 1 to FIG. 5.

Figure 1:
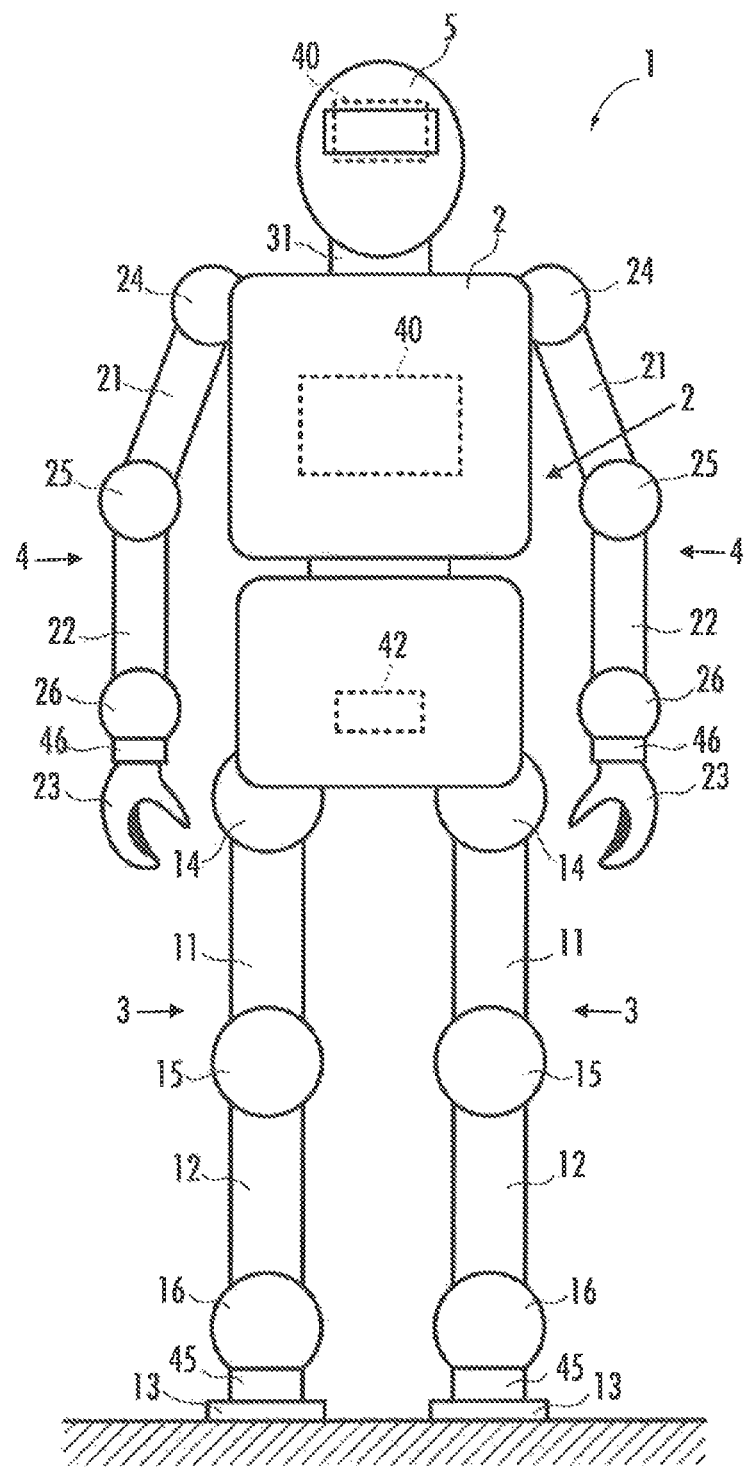
FIG. 1 is a diagram illustrating the configuration of a mobile robot according to an embodiment of the present invention.

Referring to FIG. 1, a mobile robot 1 according to the present embodiment is an example of a humanoid robot. The mobile robot 1 (hereinafter referred to simply as "the robot 1" in some cases) has a base body 2 corresponding to an upper body, a pair of left and right (two) leg links 3, 3 and a pair of left and right (two) arm links 4, 4 as a plurality of movable links extended from the base body 2, and a head 5.

The leg links 3 are extended from a lower portion of the base body 2. Each of the leg links 3 is constituted of element links corresponding to a thigh 11, a crus 12, and a foot 13, which are connected through the intermediary of a hip joint 14, a knee joint 15, and an ankle joint 16 in this order from the base body 2 side.

Further, according to the present embodiment, the joints 14, 15 and 16 between the foot 13, which is the distal end portion of each of the leg links 3, and the base body 2 are configured such that the foot 13 of each of the leg links 3 has, for example, six degrees of freedom of motion with respect to the base body 2.

For example, the hip joint 14 is composed of three element joints (not illustrated) so as to have a degree of freedom of rotation about a total of three axes. The knee joint 15 is composed of a single element joint (not illustrated) so as to have a degree of freedom of rotation about a single axis. The ankle joint 16 is composed of two element joints (not illustrated) so as to have a degree of freedom of rotation about a total of two axes. Each of the element joints is a joint that has a degree of freedom of rotation about a single axis. Such an element joint has a structure that includes two members capable of relatively rotating about a single axis. The element joint may adopt a publicly known structure.

The arm links 4 are extended from the upper portion of the base body 2. Each of the arm links 4 is comprised of element links corresponding to an upper arm 21, a forearm 22, and a hand 23, which are connected through the intermediary of a shoulder joint 24, an elbow joint 25, and a wrist joint 26 in this order from the base body 2 side.

Further, the joints 24, 25 and 26 located between the hand 23, which is the distal end portion of each of the arm links 4, and the base body 2 are configured such that the hand 23 of each of the arm links 4 has, for example, six degrees of freedom with respect to the base body 2 in the present embodiment.

For example, the shoulder joint 24 is composed of three element joints (not illustrated) so as to have a degree of freedom of rotation about a total of three axes. The elbow joint 25 is composed of a single element joint (not illustrated) so as to have a degree of freedom of rotation about a single axis. The wrist joint 26 is composed of two element joints (not illustrated) so as to have a degree of freedom of rotation about a total of two axes.

Further, the hands 23 of the arm links 4 in the present embodiment are configured to be capable of grasping an object. For example, each of the hands 23 is composed of an appropriate clamp mechanism or a plurality of finger mechanisms or the like capable of performing motions similar to those of human fingers.

Supplementarily, although each of the leg links 3 is configured to have six degrees of freedom of motion according to the present embodiment, the leg links 3 may alternatively be configured to have seven or more degrees of freedom of motion. This applies to the arm links 4. Further, each of the leg links 3 and the arm links 4 may include linear motion type joints rather than being limited to rotary type joints.

The head 5 is attached to the upper end of the base body 2 through the intermediary of a neck joint 31. The neck joint 31 is configured to have a degree of freedom of rotation about one axis, two axes or three axes. The head 5 may be omitted.

The above has outlined the mechanical configuration of the robot 1.

A description will now be given of the configuration for controlling the motion of the robot 1.

Figure 2:
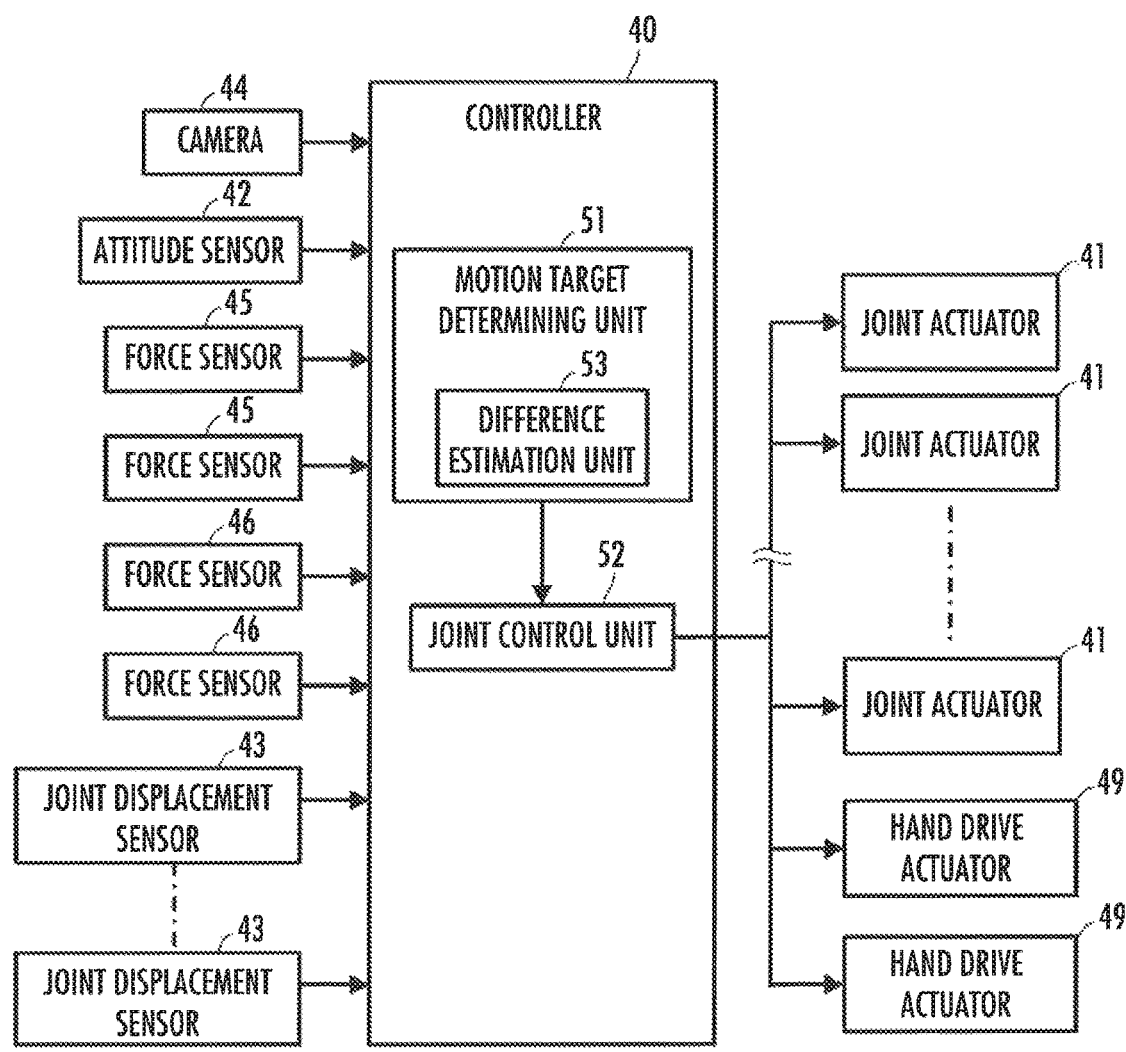
FIG. 2 is a block diagram illustrating the configuration related to the control of the motions of the mobile robot according to the embodiment.

As illustrated in FIG. 2, the robot 1 has a controller 40 for controlling the motion of the robot 1, joint actuators 41 for driving the individual joints (element joints), hand drive actuators 49 for making the hands 23 perform a grasping motion, and various types of necessary sensors.

The sensors include an attitude sensor 42, which generates an output based on the attitude of the base body 2 of the robot 1, joint displacement sensors 43, which generate outputs based on the amounts of displacement (the rotational angle) of each joint (element joint) of the robot 1, a camera 44 serving as a visual sensor of the robot 1, force sensors 45, which generate outputs based on external forces (translational forces and moments) received by the foot 13 of each of the leg links 3 from an object with which the foot 13 comes in contact, and force sensors 46, which generate outputs based on external forces (translational forces and moments) received by the hand 23 of each of the arm links 4 from an object with which the hand 23 comes in contact.

The attitude sensor 42 is a sensor installed to the base body 2 such that the attitude (the spatial orientation) of the base body 2 can be detected by, for example, a strapdown method. The attitude sensor 42 is comprised of a gyro sensor, which detects three-axis angular velocities, and an acceleration sensor, which detects three-axis translational accelerations.

The camera 44 is composed of, for example, a stereo camera. The camera 44 is mounted on, for example, the head 5, as illustrated in FIG. 1. In place of the camera 44 or in addition to the camera 44, a distance measurement sensor, such as, for example, a scanning type laser distance measurement sensor, may be installed to the robot 1. The camera 44 may alternatively be mounted on the base body 2.

The joint displacement sensors 43 are provided one each for each element joint. Each of the joint displacement sensors 43 is comprised of a rotational angle sensor, such as a rotary encoder or a potentiometer.

The force sensors 45 are provided one each for each of the leg links 3. Each of the force sensors 45 is composed of, for example, a six-axis force sensor interposed between the ankle joint 16 and the foot 13 of each of the leg links 3, as illustrated in FIG. 1. Further, each of the force sensors 46 is provided for each of the arm links 4. Each of the force sensors 46 is comprised of, for example, a six-axis force sensor interposed between the wrist joint 26 and the hand 23 of each of the arm links 4, as illustrated in FIG. 1.

The joint actuators 41 are provided one each for each element joint. The joint actuators 41 are constructed of electric motors or hydraulic actuators.

The hand drive actuators 49 are provided one each for each of the hands 23. The hand drive actuators 49 are composed of electric motors or hydraulic actuators. Each of the hand drive actuators 49 may be composed of a plurality of actuators for each of the hands 23.

The controller 40 is constituted of an electronic circuit unit, which includes a CPU, a RAM, a ROM, an interface circuit and the like. The controller 40 receives the detection signals from the foregoing sensors.

The controller 40 has, as functions implemented by executing an installed program or a function implemented by a hardware configuration, a motion target determining unit 51, which sequentially determines motion targets that define the motions of the joints of the robot 1, and a joint control unit 52, which controls the joint actuators 41 according to the motion targets.

Each of the motion targets sequentially determined by the motion target determining unit 51 in the present embodiment is composed of the desired position and attitude of the foot 13 of each of the leg links 3 and the hand 23 of each of the arm links 4, the desired position and attitude of the base body 2, and the desired attitude of the head 5.

The position of a portion, such as the foot 13, of the robot 1 means the position of a predetermined representative point of the portion, and the attitude of the portion means the spatial orientation of the portion.

Further, the desired position and attitude of a portion of the robot 1 mean a set of the desired value of the position of the portion (the desired position) and the desired value of the attitude of the portion (the desired attitude).

According to the present embodiment, the desired position and attitude of each of the feet 13 and the hands 23, and the base body 2 are expressed in the form of the desired values of the position and the attitude observed in a global coordinate system fixedly set to a floor or the like in an environment wherein the robot 1 moves. Further, the desired attitude of the head 5 is expressed in the form of the desired value of the relative attitude of the head 5 observed in a local coordinate system fixedly set to the base body 2.

Further, a motion target sequentially determined by the motion target determining unit 51 is determined by correcting, as necessary, a reference motion target according to the actual motion situation of the robot 1.

The reference motion target is a motion target according to a basic guideline for having the robot 1 perform a required motion. The reference motion target in the present embodiment is composed of the trajectories of the reference desired position and attitude of the foot 13 of each of the leg links 3 and the hand 23 of each of the arm links 4, the trajectories of the reference desired position and attitude of the base body 2, and the trajectory of the reference desired attitude of the head 5. The trajectories mean the time series of instantaneous values (the instantaneous values at predetermined control processing cycles).

The reference motion targets are created to enable the robot 1 to properly perform a required motion when it is assumed that the actual motion of the robot 1 will be carried out exactly according to the reference motion target in an expected environment.

The joint control unit 52 sequentially determines the desired amount of displacement (the desired value of a rotational angle) of each joint (element joint) of the robot 1 by arithmetic processing of the inverse kinematics of the robot 1 from a motion target (instantaneous value) determined by the motion target determining unit 51. Then, the joint control unit 52 feedback-controls the joint actuators 41 such that the actual amount of displacement of each joint (the detection value provided by the joint displacement sensor 43) agrees with the desired amount of displacement.

Further, the joint control unit 52 controls the hand drive actuators 49 such that the hands 23 perform the grasping motion in the case where, for example, the hands 23 of the arm links 4 are to be supported by a structure, which will be discussed later.

The motion target determining unit 51 and the joint control unit 52 correspond to the motion target determining unit and the joint control unit, respectively, in the present invention. The motion target determining unit 51 includes the function as a difference estimation unit 53. The difference estimation unit 53 corresponds to the difference estimation unit in the present invention.

The control of the motion of the robot 1 according to the present embodiment will now be specifically described. The following description will be given of the control of the motion of the robot 1 by taking, as a major example, the case where the robot 1 is instructed to climb up or down a ladder, which is an example of the structure that the robot 1 climbs up or down.

To have the robot 1 climb up or down the ladder, the controller 40 acquires the information on the structure, including the position, the attitude and the like of the ladder to be climbed up or down mainly on the basis of the images captured by the camera 44. The information on the structure makes it possible to identify the position and the attitude of the ladder, the length and width of the ladder, the position of each rung in the ladder, and the shape, the outside diameter and the like of each rung.

All or a part of the information on the structure can be also acquired by the communication with a server outside the robot 1 or acquired from map data or the like stored and retained beforehand in the robot 1.

The controller 40 then generates a reference motion target of the robot 1 by the motion target determining unit 51.

In this case, the motion target determining unit 51 generates, according to a predetermined rule, the reference motion target (the reference motion target for a predetermined period after the current time) for the robot 1 to climb up or down the ladder recognized based on the acquired information on the structure at a timing mainly before the robot 1 starts the motion for climbing up or down the ladder or at a predetermined timing in the middle of climbing up or down the ladder.

In this case, the motion target determining unit 51 generates the reference motion target such that the reference motion target includes, for example, a climbing up or down motion in which, in a state wherein the hands 23, 23 of both the arm links 4, 4 and the foot 13 of one of the leg links 3 are in contact with the ladder so as to be supported and the foot 13 of the other of the leg links 3 is positioned away from the ladder (floated in the air), the foot 13 of the other of the leg links 3 is moved toward the desired support position and attitude, and the foot 13 is brought into contact with a rung of the ladder at the desired support position and attitude thereby to be supported (hereinafter referred to as "the leg link movement climbing up or down motion"), and a climbing up or down motion in which, in a state wherein the feet 13, 13 of both the leg links 3, 3 and the hand 23 of one of the arm links 4 are brought into contact with the ladder so as to be supported and the hand 23 of the other of the arm links 4 is positioned away from the ladder (floated in the air), the hand 23 of the other of the arm links 4 is moved toward the desired support position and attitude and the hand 23 is brought into contact with a rung or a support strut of the ladder at the desired support position and attitude so as to be supported (hereinafter referred to as "the arm link movement climbing up or down motion).

The desired support position and attitude of each of the feet 13 means the desired position and attitude of the foot 13 at a timing at which the foot 13 is brought into contact with the ladder thereby to be supported by the ladder. This applies to the desired support position and attitude of each of the hands 23.

In the present embodiment, the desired support position and attitude of each of the feet 13 are more specifically the desired position and attitude of the foot 13 in a state in which the bottom surface of the foot 13 is in contact with or rested on a rung of the ladder. Further, the desired support position and attitude of each of the hands 23 more specifically means the desired position and attitude of the hand 23 in a state in which the hand 23 is grasping a rung or a support strut of the ladder.

In the following description, the leg link 3 having the foot 13 to be supported by the ladder will be referred to as "the to-be-supported leg link 3," and the leg link 3 having the foot 13 to be moved will be referred to as "the to-be-moved leg link 3." Further, the foot 13 of the to-be-supported leg link 3 and the foot 13 of the to-be-moved leg link 3 will be referred to as "the to-be-supported foot 13" and "the to-be-moved foot 13," respectively, in some cases.

Similarly, the arm link 4 having the hand 23 to be supported by the ladder will be referred to as "the to-be-supported arm link 4," and the arm link 4 having the hand 23 to be moved will be referred to as "the to-be-moved arm link 4." Further, the hand 23 of the to-be-supported arm link 4 and the hand 23 of the to-be-moved arm link 4 will be referred to as "the to-be-supported hand 23" and "the to-be-moved hand 23," respectively, in some cases.

Further, the desired position and attitude of the base body 2 in the reference motion target are generated to remain constant such that, for example, the distance between the base body 2 and the ladder in the direction of the thickness of the ladder (i.e., the direction substantially orthogonal to the support strut and the rungs of the ladder) is substantially constant and the trunk axis of the base body 2 is substantially parallel to the surface of the robot 1 in the direction of the thickness of the ladder (i.e., the surface adjacent to the base body 2 of the robot 1).

Alternatively, however, the desired position and attitude of the base body 2 may be generated such that the distance between the base body 2 and the ladder or the attitude or the like of the base body 2 with respect to the ladder changes with time.

Further, the desired attitude of the head 5, i.e., the desired relative attitude with respect to the base body 2, in the reference motion target is determined to be maintained, for example, at a fixed attitude with respect to the base body 2. Alternatively, however, the desired attitude of the head 5 may be generated such that the attitude of the head 5 with respect to the base body 2 changes with time.

FIG. 3A illustrates an example mode of the leg link movement climbing up or down motion of the robot 1 in the middle of climbing a ladder A according to the reference motion target. In the illustrated example, the robot 1 is in a state wherein the robot 1 is grasping a rung a1 of the ladder A by the hands 23, 23 of both the arm links 4, 4 and the foot 13 of one of the leg links 3 of the robot 1 is supported on a rung a2, and the robot 1 is about to move the foot 13 of the other of the leg links 3 that is away from the ladder A toward the desired support position and attitude on a rung a3, which is immediately above the rung a2 so as to support the foot 13 of the other of the leg links 3 by resting the foot 13 on the rung a3.

The reference desired attitude of the base body 2 in FIG. 3A is set to an attitude in which, for example, the trunk axis of the base body 2 is oriented in the vertical direction.

In FIG. 3A (or FIG. 3B, which will be discussed hereinafter), a component denoted by a reference character "b" indicates one of the support struts on both sides of the ladder A. Further, in FIG. 3A and FIG. 3B, the head 5 of the robot 1 is omitted.

Supplementarily, the reference motion target for having the robot 1 climb up or down a structure, such as the ladder A, may include a climbing up or down motion (hereinafter referred to as "the leg link and arm link movement climbing up or down motion") in which, in a state wherein the hand 23 of one of the arm links 4 and the foot 13 of one of the leg links 3 are in contact with the ladder so as to be supported and the hand 23 of the other of the arm links 4 and the foot 13 of the other of the leg links 3 are positioned away from the ladder, the hand 23 of the other of the arm links 4 and the foot 13 of the other of the leg links 3 are moved toward their desired support positions and attitudes and then the hand 23 and the foot 13 are brought into contact with the ladder so as to be supported at the desired support positions and attitudes, in place of the leg link movement climbing up or down motion and the arm link movement climbing up or down motion, or in addition to the leg link movement climbing up or down motion and the arm link movement climbing up or down motion.

Further, the reference motion target may be prepared in advance and stored and retained in a storage device of the robot 1. Alternatively, the reference motion target may be prepared using an external server and the prepared motion target may be transferred, as necessary, from the external server to the robot 1 by radio communication.

Further alternatively, the reference motion target may be sequentially generated in a real-time manner while the robot 1 is climbing up or down a structure, such as the ladder A.

The following description of the present embodiment will be given of major examples, in which the robot 1 is instructed to perform the leg link movement climbing up or down motion and the arm link movement climbing up or down motion. A supplemental description will be given of a case where a leg link and arm link movement climbing up or down motion is performed.

The leg link movement climbing up or down motion, the arm link movement climbing up or down motion, and the leg link and arm link movement climbing up or down motion correspond to the climbing up or down motion in the present invention.

Further, in the leg link movement climbing up or down motion, both the arm links 4, 4 correspond to the upper movable links to be supported in the present invention, and the to-be-supported leg link 3 that is one of the leg links 3, 3 and the to-be-moved leg link 3 that is the other of the leg links 3, 3 correspond to the lower movable link to be supported and the lower movable link to be moved, respectively, in the present invention.

Further, in the arm link movement climbing up or down motion, both the leg links 3, 3 correspond to the lower movable links to be supported in the present invention, and the to-be-supported arm link 4 that is one of the arm links 4, 4 and the to-be-moved arm link 4 that is the other of the arm links 4, 4 correspond to the upper movable link to be supported and the upper movable link to be moved, respectively, in the present invention.

Further, in the leg link and arm link movement climbing up or down motion, the to-be-supported arm link 4 that is one of both the arm links 4, 4 and the to-be-supported leg link 3 that is one of both the leg links 3, 3 correspond to the upper movable link to be supported and the lower movable link to be supported, respectively, in the present invention, and the to-be-moved arm link 4 that is the other of both the arm links 4, 4 and the to-be-moved leg link 3 that is the other of both the leg links 3, 3 correspond to the movable links to be moved in the present invention.

Subsequently, the motion target determining unit 51 sequentially determines, using a reference motion target, a motion target for controlling the actual motion of the robot 1, i.e. a motion target to be output to the joint control unit 52, at a predetermined control processing cycle. At this time, the joint control unit 52 controls each of the joint actuators 41 of the robot 1 so as to control the amount of displacement of each element joint and also controls each of the hand drive actuators 49 so as to control the grasping motion of each of the hands 23 according to the motion target. Thus, the actual motion, namely, the climbing up or down the ladder, of the robot 1 is performed.

In this case, the processing of determining the motion target at each control processing cycle by the motion target determining unit 51 is carried out as described below.

A situation in which the robot 1 is climbing up or down a ladder according to a motion target will now be assumed. In this situation, an overall center of gravity G of the robot 1 is away from the ladder A in the horizontal direction, as illustrated in FIG. 3A. This causes the robot 1 to be easily subjected to a moment (primarily a moment in the pitch direction) attributable to the gravitational force acting on the overall center of gravity G.

In the description of the present embodiment, the pitch direction is the direction about a horizontal axis that extends substantially in the lateral direction of the robot 1, the roll direction is the direction about the horizontal axis that extends substantially in the longitudinal direction of the robot 1, and the yaw direction is the direction about an axis that extends substantially in the vertical direction.

Further, especially in the leg link movement climbing up or down motion or the leg link and arm link movement climbing up or down motion, in which only the foot 13 of one leg link 3 (the to-be-supported leg link 3) of both the leg links 3, 3 of the robot 1 is supported by the ladder, the to-be-supported hand 23 and the to-be-supported foot 13 tend to slip off the ladder due to the foregoing moment.

Also in the arm link movement climbing up or down motion, in which the feet 13, 13 of both the leg links 3, 3 of the robot 1 are supported by the ladder, the to-be-supported hand 23 and the to-be-supported foot 13 slip off the ladder due to the foregoing moment in some cases.

If such slippage occurs, the whole robot 1 rotates primarily in the pitch direction, using the action center point of the overall load acting from the ladder onto the hand 23 supported by the ladder, i.e. the to-be-supported hand 23, as the supporting point (the center of rotation). As a result, the attitude of the entire robot 1 deviates from the attitude of the motion target.

FIG. 3B illustrates a situation in which, for example, a slippage of the to-be-supported hands 23, 23 and the to-be-supported foot 13 occurs while the leg link movement climbing up or down motion is being performed, causing the robot 1 to rotate. The illustrated example indicates that the robot 1 has rotated by an angle θ in the pitch direction from the state of the motion target. When having the robot 1 climb up or down a structure, such as the ladder A, the situation in which the robot 1 rotates from the state of the motion target as described above frequently occurs.

Further, there are some cases where the robot 1 rotates in the roll direction or the yaw direction or the like from the state of a motion target during the execution of the arm link movement climbing up or down motion or the leg link and arm link movement climbing up or down motion, in which only the hand 23 of one arm link 4 of the arm links 4, 4 is supported by a structure, such as the ladder A.

The situation in which the robot 1 rotates from the state of a motion target may occur according to the elastic deformation of the hand 23, the foot 13 or the like supported by a structure, such as the ladder A, in any one climbing up or down motion among the leg link movement climbing up or down motion, the arm link movement climbing up or down motion, and the leg link and arm link movement climbing up or down motion.

Thus, if the robot 1 rotates, then the lower portion or the like of the base body 2 moves closer to the ladder, frequently leading to the interference between the to-be-supported leg link 3 or the to-be-moved leg link 3 or the to-be-moved arm link 4 and the ladder.

According to the present embodiment, therefore, the motion target determining unit 51 sequentially estimates the difference between the actual position and attitude of the to-be-supported foot 13 and the desired position and attitude thereof while the leg link movement climbing up or down motion or the leg link and arm link movement climbing up or down motion is being carried out, and determines the motion target at each control processing cycle so as to update, as necessary, the motion target from a reference motion target on the basis of the estimated difference.

Further, in the present embodiment, the motion target determining unit 51 estimates the difference between the actual position and attitude of the to-be-moved hand 23 and desired position and attitude thereof while the arm link movement climbing up or down motion or the leg link and arm link movement climbing up or down motion is being carried out, and determines the motion target at each control processing cycle so as to update, as necessary, the motion target from a reference motion target on the basis of the estimated difference.

Specifically, the motion target determining unit 51 carries out the processing, which is illustrated by the block diagram of FIG. 4, at each control processing cycle while the leg link movement climbing up or down motion or the leg link and arm link movement climbing up or down motion is being performed, thereby determining the manipulated variable for updating the motion target of the robot 1 from a reference motion target (hereinafter referred to as "the rotation countermeasure manipulated variable").

Further, the motion target determining unit 51 carries out the processing, which is illustrated by the block diagram of FIG. 5, at each control processing cycle while the arm link movement climbing up or down motion or the leg link and arm link movement climbing up or down motion is being performed, thereby determining the rotation countermeasure manipulated variable.

Figure 4:
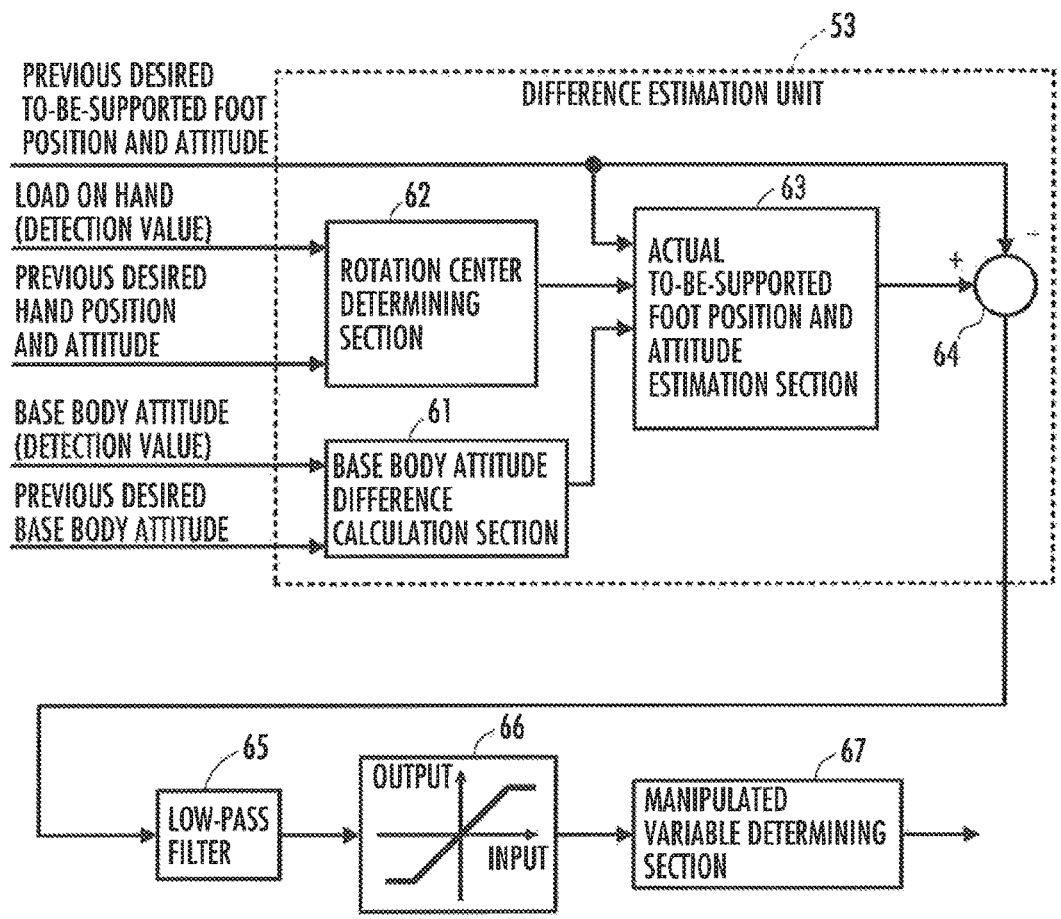
FIG. 4 is a block diagram illustrating the major processing carried out by a motion target determining unit illustrated in FIG. 2.

In the leg link and arm link movement climbing up or down motion, the motion target determining unit 51 carries out one or both of the processings illustrated by the block diagrams in FIG. 4 and FIG. 5. When both processings illustrated by the block diagrams of FIG. 4 and FIG. 5 are carried out, the motion target is updated on the basis of the manipulated variable obtained by, for example, combining the rotation countermeasure manipulated variables determined by the individual processings.

First, the processing illustrated by the block diagram of FIG. 4 will be described. Referring to FIG. 4, the motion target determining unit 51 acquires, at each control processing cycle during the execution of the leg link movement climbing up or down motion or the leg link and arm link movement climbing up or down motion, the detection value of the current attitude of the base body 2 indicated by an output of the attitude sensor 42, the detection value of the current load on each of the hands 23 (the translational force and the moment to which each of the hands 23 is subjected from the ladder by which each of the hands 23 is supported) indicated by an output of the force sensor 46 of each of the arm links 4, the previous desired to-be-supported foot position and attitude, which are the desired position and attitude of the to-be-supported foot 13 determined at the previous control processing cycle, the previous desired hand position and attitude, which are the desired position and attitude of each of the hands 23 determined at the previous control processing cycle, and the previous desired base body attitude, which is the desired attitude of the base body 2 determined at the previous control processing cycle.

The previous desired to-be-supported foot position and attitude, the previous desired hand position and attitude, and the previous desired base body attitude mean the latest desired values before the current time.

Regarding the detection value of the load on the hand 23 and the previous desired hand position and attitude, in the case where the leg link and arm link movement climbing up or down motion, in which only the hand 23 of one arm link 4 of the two arm links 4, 4 is supported by the ladder, is carried out, the detection value of the load on the hand 23 and the previous desired hand position and attitude may be acquired only on one of the arm links 4 that is supported by the ladder.

Further, the motion target determining unit 51 carries out processing through a base body attitude difference calculation section 61 and processing through a rotation center determining section 62.

In the processing through the base body attitude difference calculation section 61, the motion target determining unit 51 calculates the base body attitude difference, which is the difference, namely, the rotational angle difference, between a previous desired base body attitude and the detection value of the current attitude of the base body 2.

In the present embodiment, the desired position and attitude of the base body at each control processing cycle are determined to coincide with the reference desired position and attitude of the base body 2 at the time of the control processing cycle. Hence, the base body attitude difference may be calculated using the reference desired attitude of the base body 2 at the time of a previous control processing cycle instead of a previous desired base body attitude.

In the processing through the rotation center determining section 62, the motion target determining unit 51 calculates the position of the action center point (the center-of-gravity point of load distribution) of the overall load (resultant load) acting on both of the hands 23, 23 from the detection value of the load on each of the hands 23 and the previous desired hand position and attitude of each of the hands 23, and determines the calculated position as the center of rotation of the robot 1.

In this case, in the leg link movement climbing up or down motion, the point between the surface of one of the hands 23 that is in contact with the ladder (the grasping part) and the surface of the other of the hands 23 that is in contact with the ladder (the grasping part) is determined as the center of rotation. Further, in the leg link and arm link movement climbing up or down motion, a point in the contact surface of one of both the hands 23 that is supported by the ladder is determined as the center of rotation.

Next, the motion target determining unit 51 carries out the processing through an actual to-be-supported foot position and attitude estimation section 63 adapted to estimate the actual position and attitude of a foot to be supported, which are the actual position and attitude of the to-be-supported foot 13.

In the processing through the actual supported foot position and attitude estimation section 63, the motion target determining unit 51 estimates, as the actual to-be-supported foot position and attitude, the position and attitude obtained by virtually rotating the previous desired to-be-supported foot position and attitude about the center of rotation, which has been determined by the processing through the rotation center determining section 62, by a rotational angle equivalent to the base body attitude difference.

Thus, it is regarded that the base body attitude difference has been produced by the rotation of the robot 1 about the center of rotation determined by the processing through the rotation center determining section 62, and the actual to-be-supported foot position and attitude are estimated.

Subsequently, the motion target determining unit 51 calculates the difference between the previous desired to-be-supported foot position and attitude and the estimated values of the actual to-be-supported foot position and attitude (hereinafter referred to as "the to-be-supported foot position and attitude difference") through a difference calculation section 64.

The estimated value of the to-be-supported foot position and attitude difference is sequentially calculated at the predetermined control processing cycle by the processing carried out through the base body attitude difference calculation section 61, the rotation center determining section 62, the actual to-be-supported foot position and attitude estimation section 63, and the difference calculation section 64 described above.

In the processing illustrated by the block diagram of FIG. 4, the base body attitude difference calculation section 61, the rotation center determining section 62, the actual to-be-supported foot position and attitude estimation section 63, and the difference calculation section 64 constitute the difference estimation unit 53. The foregoing to-be-supported foot position and attitude difference corresponds to the position and attitude difference in the present invention.

The motion target determining unit 51 supplies the estimated value of the to-be-supported foot position and attitude difference calculated as described above to a low-pass filter 65, which carries out filtering to remove high-frequency components attributable to noises or the like, and further supplies the output of the low-pass filter 65 to a limiter 66 thereby to carry out a limiting process for limiting the estimated value of the to-be-supported foot position and attitude difference to a range defined by predetermined upper limit value and lower limit value.

Then, based on the estimated value of the to-be-supported foot position and attitude difference that has been subjected to the processing by the low-pass filter 65 and the limiter 66 described above, the motion target determining unit 51 carries out, through a manipulated variable determining section 67, the processing of determining a rotation countermeasure manipulated variable (corrective amount) for updating the motion target of the robot 1 from a reference motion target.

According to the present embodiment, the manipulated variable determining section 67 determines, as the rotation countermeasure manipulated variable, the manipulated variable for adjusting the desired position/attitude (at least one of the desired position and the desired attitude), of the distal end, namely, the foot 13 or the hand 23, of one or more movable links (i.e., for updating at least one of the desired position and the desired attitude thereof from a reference motion target) so as to restrain the actual attitude of the base body 2 from deviating from a desired attitude while preventing at the same time the occurrence of the interference between the leg links 3 or the arm links 4 and the ladder.

In this case, the manipulated variable determining section 67 determines the rotation countermeasure manipulated variable such that at least one of the relative position/attitude (at least one of the relative position and the relative attitude)

of the to-be-supported foot 13 with respect to the base body 2 and the desired support position/attitude (at least one of the desired support position and the desired support attitude) of the to-be-moved foot 13 is shifted from the position/attitude in a reference motion target by an amount based on the estimated value of the to-be-supported foot position and attitude difference.

Thus, the manipulated variable determining section 67 determines, as the rotation countermeasure manipulated variable, at least one of the correction amount of the desired position/attitude (the correction amount of the desired position/attitude determined at the current control processing cycle) of the to-be-supported foot 13 and the correction amount of the desired support position/attitude, which indicates the desired position at which the to-be-moved foot 13 should reach.

The rotation countermeasure correction amount is determined from the estimated value of the to-be-supported foot position and attitude difference according to an arithmetic expression, a map or the like, which is established in advance. Further, if the estimated value of the to-be-supported foot position and attitude difference is zero or substantially zero, then the rotation countermeasure manipulated variable is set to zero.

It is assumed that, for example, the slippage of the to-be-supported hands 23, 23 and the to-be-supported foot 13 causes the base body 2 to incline in the pitch direction from the attitude of a motion target, bringing the lower end portion of the base body 2 closer to the ladder A as illustrated in FIG. 3B. In this state, the actual position of the to-be-supported foot 13 is dislocated from a desired position toward the back in the direction of the thickness of the ladder A (toward the back as observed from the robot 1).

In such a state, the manipulated variable determining section 67 determines the correction amount of the desired position/attitude of the to-be-supported foot 13 (the correction amount at the current control processing cycle) such that the distance between the connection part, namely, the hip joint 14, between the to-be-supported leg link 3 and the base body 2, and the to-be-supported foot 13 is larger than the corresponding distance in the reference motion target, thereby moving the lower end portion of the base body 2 away from the ladder A. The correction amount is determined based on the degree of the magnitude of the estimated value of the to-be-supported foot position and attitude difference, i.e. the magnitude of each component of the position difference and the attitude difference.

Further, the manipulated variable determining section 67 determines the correction amount of the desired support position/attitude of the foot 13 of the to-be-moved leg link 3 such that the foot 13 at the desired support position and attitude, which are the desired position and attitude that the to-be-moved foot 13 should reach, is brought closer to the base body 2 than the foot 13 at the desired support position and attitude in the reference motion target. The correction amount is determined based on the degree of the magnitude of the estimated value of the to-be-supported foot position and attitude difference, i.e. the magnitude of each component of the position difference and the attitude difference.

Thus, the correction amount of the desired position/attitude of the to-be-supported foot 13 and the correction amount of the desired support position/attitude of the to-be-moved foot 13 are determined as the rotation countermeasure manipulated variables on the basis of the estimated value of the to-be-supported foot position and attitude difference.

Depending on, for example, the degree of the magnitude of the estimated value of the to-be-supported foot position and attitude difference, i.e. the magnitude of each component of the position difference and the attitude difference, the correction amount of only one of the desired position/attitude of the to-be-supported foot 13 and the desired support position/attitude of the to-be-moved foot 13 may be determined, setting the correction amount of the other to zero.

Further, in the leg link and arm link movement climbing up or down motion, the correction amount of the desired support position/attitude of the to-be-moved arm link 4 can be determined as the rotation countermeasure manipulated variable on the basis of the estimated value of the to-be-supported foot position and attitude difference in addition to or in place of the correction amount or correction amounts of one or both of the desired position/attitude of the to-be-supported foot 13 and the desired support position/attitude of the to-be-moved foot 13.

A description will now be given of the processing illustrated by the block diagram of FIG. 5. The processing differs only partly from the processing illustrated by the block diagram of FIG. 4, so that detailed description of the same aspects as those of the processing illustrated by the block diagram of FIG. 4 will be omitted.

Referring to FIG. 5, at each control processing cycle during the execution of the arm link movement climbing up or down motion or the leg link and arm link movement climbing up or down motion, the motion target determining unit 51 acquires the detection value of the current attitude of the base body 2 indicated by an output of the attitude sensor 42, the detection value of the current load on the to-be-supported hand 23 that is indicated by an output of the force sensor 46 of the to-be-supported arm link 4, the previous desired to-be-moved hand position and attitude, which are the desired position and attitude of the to-be-moved hand 23 determined at the previous control processing cycle, the previous desired to-be-supported hand position and attitude, which are the desired position and attitude of the to-be-supported hand 23 determined at the previous control processing cycle, and the previous desired base body attitude, which is the desired attitude of the base body 2 determined at the previous control processing cycle.

The previous desired to-be-supported hand position and attitude, the previous desired to-be-moved hand position and attitude, and the previous desired base body attitude mentioned above mean the latest desired values before the current time.

Then, the motion target determining unit 51 carries out the processing through a base body attitude difference calculation section 71 and the processing through a rotation center determining section 72.

The processing through the base body attitude difference calculation section 71 is the same as the processing by the base body attitude difference calculation section 61 in FIG. 4.

Further, in the processing through the rotation center determining section 72, the motion target determining unit 51 calculates the position of the action center point (the center-of-gravity point of load distribution) of the overall load acting on the to-be-supported hand 23 from the detection value of the load on the to-be-supported hand 23 and the previous desired to-be-supported hand position and attitude thereof, and determines the calculated position as the center of rotation of the robot 1. In this case, a point in a contact surface of the to-be-supported hand 23 is determined as the center of rotation.

Subsequently, the motion target determining unit 51 carries out the processing through an actual to-be-moved hand position and attitude estimation section 73 adapted to estimate the actual to-be-moved hand position and attitude, which are the actual position and attitude of the to-be-moved hand 23.

In the processing through the actual to-be-moved hand position and attitude estimation section 73, the motion target determining unit 51 estimates, as the actual to-be-moved hand position and attitude, the position and attitude obtained by virtually rotating the previous desired to-be-moved hand position and attitude about the center of rotation, which has been determined in the processing through the rotation center determining section 72, by a rotational angle equivalent to the base body attitude difference.

Thus, it is regarded that the base body attitude difference has been produced by the rotation of the robot 1 about the center of rotation, which has been determined in the processing through the rotation center determining section 72, and the actual to-be-moved hand position and attitude are estimated.

Subsequently, the motion target determining unit 51 uses the difference calculation section 74 to calculate the difference between the previous desired to-be-moved hand position and attitude and the estimated value of the actual to-be-moved hand position and attitude (hereinafter referred to as "the to-be-moved hand position and attitude difference").

The estimated value of the to-be-moved hand position and attitude difference is sequentially calculated at a predetermined control processing cycle by the processing carried out through the base body attitude difference calculation section 71, the rotation center determining section 72, the actual to-be-moved hand position and attitude estimation section 73, and the difference calculation section 74 described above.

In the processing illustrated by the block diagram of FIG. 5, the base body attitude difference calculation section 71, the rotation center determining section 72, the actual to-be-moved hand position and attitude estimation section 73, and the difference calculation section 74 constitute the difference estimation unit 53. Further, the foregoing to-be-moved hand position and attitude difference corresponds to the position and attitude difference in the present invention.

The motion target determining unit 51 supplies the estimated value of the to-be-moved hand position and attitude difference calculated as described above to a low-pass filter 75, which carries out filtering to remove high-frequency components attributable to noises or the like, and further supplies the output of the low-pass filter 75 to a limiter 76 thereby to carry out a limiting process for limiting the estimated value of the to-be-moved hand position and attitude difference to a range defined by predetermined upper limit value and lower limit value.

Then, based on the estimated value of the to-be-moved hand position and attitude difference that has been subjected to the processing by the low-pass filter 75 and the limiter 76 as described above, the motion target determining unit 51 carries out, through a manipulated variable determining section 77, the processing of determining a rotation countermeasure manipulated variable (corrective amount) for updating the motion target of the robot 1 from a reference motion target.

As with the manipulated variable determining section 67 illustrated in FIG. 4, the manipulated variable determining section 77 determines, as the rotation countermeasure manipulated variable, the manipulated variable for adjusting the desired position/attitude, i.e. at least one of the desired position and the desired attitude of the distal end, namely, the foot 13 or the hand 23, of one or more movable links (i.e. for updating at least one of the desired position and the desired attitude thereof from a reference motion target) so as to restrain the actual attitude of the base body 2 from deviating from a desired attitude while preventing at the same time the occurrence of the interference between each of the leg links 3 or the arm links 4 and a ladder.

In this case, the manipulated variable determining section 77 determines the rotation countermeasure manipulated variable such that at least one of the relative position/attitude (at least one of the relative position and the relative attitude) of the foot 13 of one or both of the to-be-supported leg links 3 with respect to the base body 2 and the desired support position/attitude (at least one of the desired support position and the desired support attitude) of the hand 23 of the to-be-moved arm link 4 is shifted from the position/attitude in a reference motion target by an amount based on the estimated value of the to-be-moved hand position and attitude difference.

The rotation countermeasure correction amount is determined from the estimated value of the to-be-moved hand position and attitude difference according to an arithmetic expression, a map or the like, which is established in advance. Further, if the estimated value of the to-be-moved hand position and attitude difference is zero or substantially zero, then the rotation countermeasure manipulated variable is set to zero.

In a situation wherein, for example, the base body 2 rotates in the yaw direction and the lower part adjacent to the to-be-moved arm link 4 is brought closer to the ladder, causing the to-be-moved hand position and attitude difference to be produced in the arm link movement climbing up or down motion, the manipulated variable determining section 77 determines the correction amount (the correction amount at the current control processing cycle) of the desired position/attitude of the to-be-supported foot 13 such that the distance between the connection part, namely, the hip joint 14, located between one of the to-be-supported leg links 3 that is on the same side (the right side or the left side) as the to-be-moved arm link 4 and the base body 2, and the to-be-supported foot 13 is larger than the corresponding distance in the reference motion target, so that the connection part located between the base body 2 and the one of the to-be-supported leg links 3 is moved away from the ladder A. The correction amount is determined on the basis of the degree of the magnitude of the estimated value of the to-be-moved hand position and attitude difference, i.e. the magnitude of each component of the position difference and the attitude difference.

Further, the manipulated variable determining section 77 determines the correction amount of the desired support position/attitude of the to-be-moved hand 23 such that the hand 23 at the desired support position and attitude, which are the desired position and attitude that the to-be-moved hand 23 should reach, is brought closer to the base body 2 than the hand 23 at the desired support position and attitude in the reference motion target. The correction amount is determined based on the degree of the magnitude of the estimated value of the to-be-moved hand position and attitude difference, i.e. the magnitude of each component of the position difference and the attitude difference.

Thus, the correction amount of the desired position/attitude of the to-be-supported foot 13 and the correction amount of the desired support position/attitude of the to-be-moved hand 23 are determined as the rotation countermeasure manipulated variables on the basis of the estimated value of the to-be-moved hand position and attitude difference.

Depending on, for example, the degree of the magnitude of the estimated value of the to-be-moved hand position and attitude difference, i.e. the magnitude of each component of the position difference and the attitude difference, the correction amount of only one of the desired position/attitude of the to-be-supported foot 13 and the desired support position/attitude of the to-be-moved hand 23 may be determined, setting the correction amount of the other to zero.

Further, in the arm link movement climbing up or down motion, in which the feet 13, 13 of both the leg links 3, 3 are supported by the ladder, the correction amounts of the desired position/attitude of both the to-be-supported feet 13, 13 can be determined as the rotation countermeasure manipulated variables.

Further, in the leg link and arm link movement climbing up or down motion, the correction amount of the desired support position/attitude of the to-be-moved leg link 3 can be determined as the rotation countermeasure manipulated variable on the basis of the estimated value of the to-be-moved hand position and attitude difference in addition to or in place of the correction amount or correction amounts of one or both of the desired position/attitude of the to-be-supported foot 13 and the desired support position/attitude of the to-be-moved hand 23.

Supplementarily, the leg link and arm link movement climbing up or down motion may be implemented in a mode in which the rotation countermeasure manipulated variable is determined by both the processings illustrated in FIG. 4 and FIG. 5 or a mode in which the rotation countermeasure manipulated variable is determined by only one of the processings illustrated in FIG. 4 and FIG. 5. In this case, the mode for determining the rotation countermeasure manipulated variable can be selected according to, for example, the degree of the magnitude of the estimated value of the to-be-supported foot position and attitude difference or the to-be-moved hand position and attitude difference, i.e. the magnitude of each component of the position difference and the attitude difference.

During the execution of the leg link movement climbing up or down motion and the arm link movement climbing up or down motion or the leg link and arm link movement climbing up or down motion, the motion target determining unit 51 sequentially determines a motion target at each control processing cycle by correcting a reference motion target on the basis of a rotation countermeasure manipulated variable, i.e. the correction amount, determined by the manipulated variable determining section 67 or 77 as described above.

In this case, the motion target determining unit 51 makes the desired position and attitude of the base body 2 and the desired attitude of the head 5 at each control processing cycle coincide with reference motion targets in any one of the leg link movement climbing up or down motion, the arm link movement climbing up or down motion, and the leg link and arm link movement climbing up or down motion.

Further, in the leg link movement climbing up or down motion, the motion target determining unit 51 holds the desired position and attitude of each of the hands 23, 23 (the to-be-supported hands 23, 23) of both the arm links 4, 4 at each control processing cycle at the current position and attitude (i.e., the desired support position and attitude when the hands 23, 23 are supported by the ladder or grasping the ladder).

Further, in the leg link movement climbing up or down motion, the motion target determining unit 51 determines the desired position and attitude of the to-be-supported foot 13 at each control processing cycle to be the position and attitude obtained by correcting the position and attitude in a reference motion target on the basis of the rotation countermeasure manipulated variable, i.e. the correction amount, determined by the manipulated variable determining section 67.

Further, in the leg link movement climbing up or down motion, the motion target determining unit 51 determines the desired position and attitude of the foot 13 of the to-be-moved leg link 3 at each control processing cycle such that the trajectory of the desired position and attitude of the to-be-moved foot 13 after the current time is changed toward the desired support position and attitude obtained by correcting the desired support position and attitude in a reference motion target on the basis of the rotation countermeasure manipulated variable, i.e. the correction amount, determined by the manipulated variable determining section 67.

Further, in the arm link movement climbing up or down motion, the motion target determining unit 51 holds the desired position and attitude of the to-be-supported hand 23 at each control processing cycle at the current position and attitude (i.e., the desired support position and attitude when the hand 23 is supported by the ladder or grasping the ladder).

Further, in the arm link movement climbing up or down motion, the motion target determining unit 51 determines the desired position and attitude of the to-be-moved hand 23 at each control processing cycle such that the trajectory of the desired position and attitude of the hand 23 of the to-be-moved arm link 4 after the current time is changed toward the desired support position and attitude obtained by correcting the desired support position and attitude in a reference motion target on the basis of the rotation countermeasure manipulated variable, i.e. the correction amount, determined by the manipulated variable determining section 77.

Further, in the arm link movement climbing up or down motion, the motion target determining unit 51 determines the desired position and attitude of one or two of the to-be-supported feet 13, which are to be corrected at each control processing cycle, to be the position and attitude obtained by correcting the position and attitude in a reference motion target on the basis of the rotation countermeasure manipulated variable, i.e. the correction amount, which has been determined by the manipulated variable determining section 77. The motion target determining unit 51 also makes the desired position and attitude of the foot 13 of the to-be-supported leg link 3, which are not to be corrected in the arm link movement climbing up or down motion, coincide with the desired position and attitude in the reference motion target.

Further, in the leg link and arm link movement climbing up or down motion, the motion target determining unit 51 holds the desired position and attitude of the to-be-supported hand 23, which is supported by the ladder or grasping the ladder, of the hands 23, 23 of both the arm links 4, 4 at the current position and attitude (i.e., the desired support position and attitude when the hand 23 is supported by the ladder or grasping the ladder).

Further, in the leg link and arm link movement climbing up or down motion, if the rotation countermeasure manipulated variable has been determined on the desired support position and attitude of the to-be-moved hand 23 through the manipulated variable determining section 77 in FIG. 5, then the motion target determining unit 51 determines the desired position and attitude of the to-be-moved hand 23 at each control processing cycle such that the trajectory of the desired position and attitude of the to-be-moved hand 23 after the current time is changed toward the desired support position and attitude obtained by correcting the desired support position and attitude in a reference motion target on the basis of the rotation countermeasure manipulated variable, i.e. the correction amount, determined through the manipulated variable determining section 77.

Further, in the leg link and arm link movement climbing up or down motion, if the rotation countermeasure manipulated variable has been determined on the desired support position and attitude of the to-be-moved foot 13 through the manipulated variable determining section 67 in FIG. 4, then the motion target determining unit 51 determines the desired position and attitude of the to-be-moved foot 13 at each control processing cycle such that the trajectory of the desired position and attitude of the to-be-moved foot 13 after the current time is changed toward the desired support position and attitude obtained by correcting the desired support position and attitude in a reference motion target on the basis of the rotation countermeasure manipulated variable, i.e. the correction amount, determined by the manipulated variable determining section 67.

Further, in the leg link and arm link movement climbing up or down motion, if the rotation countermeasure manipulated variable has been determined on the desired position and attitude of the to-be-supported foot 13 through the manipulated variable determining section 67 in FIG. 4 or the manipulated variable determining section 77 in FIG. 5, then the motion target determining unit 51 determines the desired position and attitude of the to-be-supported foot 13 at each control processing cycle to be the position and attitude obtained by correcting the desired position and attitude in a reference motion target on the basis of the rotation countermeasure manipulated variable, i.e. the correction amount, determined by the manipulated variable determining section 67 or 77.

Further, in the leg link and arm link movement climbing up or down motion, if the rotation countermeasure manipulated variable has been determined on the desired support position and attitude of the to-be-supported foot 13 through both the manipulated variable determining section 67 in FIG. 4 and the manipulated variable determining section 77 in FIG. 5, then the motion target determining unit 51 determines the desired position and attitude of the to-be-supported foot 13 by correcting the desired position and attitude in a reference motion target on the basis of the rotation countermeasure manipulated variable obtained by combining the rotation countermeasure manipulated variables from both the manipulated variable determining sections 67 and 77.

In any one of the leg link movement climbing up or down motion, the arm link movement climbing up or down motion, and the leg link and arm link movement climbing up or down motion, if the rotation countermeasure manipulated variable for the desired position and attitude of the to-be-supported foot 13 is zero, then the desired position and attitude of the to-be-supported foot 13 are determined to coincide with the desired position and attitude in a reference motion target.

Similarly, in any one of the climbing up or down motions, if the rotation countermeasure manipulated variable for the desired support position and attitude of the to-be-moved foot 13 is zero, then the desired support position and attitude of the to-be-moved foot 13 are determined to coincide with the desired support position and attitude in the reference motion target, or if the rotation countermeasure manipulated variable for the desired support position and attitude of the to-be-moved hand 23 is zero, then the desired support position and attitude of the to-be-moved hand 23 are determined to coincide with the desired support position and attitude in the reference motion target.

Further, when the robot 1 climbs up or down the ladder, in a period during which the leg link movement climbing up or down motion, the arm link movement climbing up or down motion, or the leg link and arm link movement climbing up or down motion is being performed and a period other than the foregoing period, a manipulated variable, such as a manipulated variable for compliance control, which is different from the rotation countermeasure manipulated variable, may be further calculated to add another correction to the reference motion target on the basis of the additional manipulated variable, thereby determining a motion target at each control processing cycle.

In the present embodiment, the joint control unit 52 controls the amounts of displacement of the joints, i.e. the element joints, of the robot 1 through the joint actuators 41 according to the motion targets determined as described above. Further, in order to have the hands 23 be supported by the ladder, the grasping motions of the hands 23 are controlled through the hand drive actuators 49 such that the hands 23 grasp the ladder.

In this case, during the execution of the leg link movement climbing up or down motion and the arm link movement climbing up or down motion or the leg link and arm link movement climbing up or down motion, even if the slippage of the to-be-supported hand 23 and the to-be-supported foot 13 occurs or the base body attitude difference is produced due to, for example, an elastic deformation of the to-be-supported arm link 4 or the to-be-supported leg link 3, the correction amount of at least one of the desired position/attitude of one or two of the to-be-supported feet 13 and the desired support position/attitude of the to-be-moved foot 13 or the to-be-moved hand 23 is variably determined as the rotation countermeasure manipulated variable on the basis of the estimated value of the to-be-supported foot position and attitude difference or the estimated value of the to-be-moved hand position and attitude difference. This arrangement makes it possible to prevent the interference between the leg links 3 or the arm links 4 and the ladder.

For example, in the situation illustrated in FIG. 3B, the to-be-supported leg link 3 is stretched to reduce the deviation of the attitude of the base body 2 from a desired attitude, i.e. to restrain the lower portion of the base body 2 from becoming excessively close to the ladder.

Further, the desired support position/attitude of the to-be-moved foot 13 is corrected such that the to-be-moved foot 13 reaching the desired support position and attitude is brought close to the base body 2. As a result, the actual support position and attitude of the to-be-moved foot 13 is prevented from deviating from a proper desired support position planned in a reference motion target. In addition, the to-be-moved foot 13 that has reached the desired support position and attitude is prevented from becoming out of contact with the ladder, i.e. slipping off the ladder.

Thus, it is possible to prevent the crus 12 or the like of each of the leg links 3 from interfering with a rung of the ladder. This enables the robot 1 to smoothly climb up or down the ladder.

Not being limited to the situation illustrated in FIG. 3B, in other situations also wherein a base body attitude difference has occurred due to, for example, the slippage of the to-be-supported hand 23 and the to-be-supported foot 13 or due to the elastic deformation of the to-be-supported arm link 4 or the to-be-supported leg link 3, it is possible to enable the robot 1 to climb up or down the ladder while at the same time preventing the interference between the leg links 3 or the arm links 4 and the ladder.

Further, according to the present embodiment, the action center point of the overall load acting on the to-be-supported hand 23 is defined as the center of rotation of the robot 1, and the actual to-be-supported foot position and attitude or the actual to-be-moved hand position and attitude are estimated on the basis of the center of rotation and the base body attitude difference. Hence, the estimation can be properly accomplished by simple arithmetic processing.

The following will describe a few modifications related to the embodiment described above.

In the foregoing embodiment, the actual to-be-supported foot position and attitude have been estimated on the basis of the center of rotation and the base body attitude difference in the processing illustrated by the block diagram of FIG. 4. Alternatively, however, the actual to-be-supported foot position and attitude can be estimated on the basis of the detection value of a load (the detection values of a translational force and a moment) of the foot 13 provided by the force sensor 45 installed to each of the leg links 3. In other words, the position and attitude of the to-be-supported foot 13, at which the foot 13 is in contact with the ladder can be known from the detection value of the load on the to-be-supported foot 13 provided by the force sensor 45 of the to-be-supported leg link 3. Thus, the actual position and attitude of the to-be-supported foot 13 can be estimated.

Further, the actual position and attitude of the to-be-moved foot 13 or the to-be-moved hand 23 can be estimated from the estimated values of the actual position and attitude of the to-be-supported foot 13 and the detection value of the amount of displacement of each joint, i.e. element joint, provided by the joint displacement sensor 43.

Further, in the foregoing embodiment, the description has been given, taking a ladder as an example of a structure that the robot 1 climbs up or down. The structure, however, may be, for example, a stepladder, a staircase having a steep slope, or a wall having irregularities.

Further, in the foregoing embodiment, the hand 23, which is the distal end portion of each of the arm links 4, has been supported by the structure, namely, the ladder, by making the hand 23 grasp a part of the structure (a rung in the embodiment). Alternatively, however, it is possible to have the distal end portion of each of the arm links 4 be supported by the structure by, for example, hooking the distal end portion on a part of the structure, e.g. a rung of the ladder.

Further, in the foregoing embodiment, the rotation countermeasure manipulated variable has been determined on the basis of the estimated value of the to-be-supported foot position and attitude difference in the processing illustrated by the block diagram of FIG. 4. Alternatively, however, the rotation countermeasure manipulated variable may be determined on the basis of the estimated value of the position and attitude difference on the to-be-moved hand 23 or the to-be-moved foot 13, or on the basis of the estimated value of the position and attitude difference and the estimated value of the to-be-supported foot position and attitude difference.

The estimated value of the position and attitude difference on the to-be-moved hand 23 or the to-be-moved foot 13 can be calculated by the same processing as the processing of determining the estimated value of the to-be-supported foot position and attitude difference (the processing by the difference estimation unit 53 in FIG. 4).

In this case, the difference between the position and attitude obtained by virtually rotating the previous desired position and attitude (the desired position and attitude determined at the previous control processing cycle) of the to-be-moved hand 23 or the to-be-moved foot 13 about the center of rotation, which has been determined by the rotation center determining section 62, by a rotational angle equivalent to the base body attitude difference, and the previous desired position and attitude is calculated as the estimated value of the position and attitude difference on the to-be-moved hand 23 or the to-be-moved foot 13.

Further, in the foregoing embodiment, the rotation countermeasure manipulated variable has been determined on the basis of the estimated value of the to-be-moved hand position and attitude difference in the processing illustrated by the block diagram of FIG. 5. Alternatively, however, the rotation countermeasure manipulated variable may be determined on the basis of the estimated value of the position and attitude difference on the to-be-moved foot 13 or the to-be-supported foot 13, or on the basis of the estimated value of the position and attitude difference on the to-be-supported foot 13, or on the basis of the estimated value of the position and attitude difference and the estimated value of the to-be-moved hand position and attitude difference.

The estimated value of the position and attitude difference on the to-be-moved foot 13 or the to-be-supported foot 13 can be calculated by the same processing as the processing of determining the estimated value of the to-be-moved hand position and attitude difference (the processing by the difference estimation unit 53 in FIG. 5).

In this case, the difference between the position and attitude obtained by virtually rotating the previous desired position and attitude (the desired position and attitude determined at the previous control processing cycle) of the to-be-moved foot 13 or the to-be-supported foot 13 about the center of rotation, which has been determined by the rotation center determining section 72, by a rotational angle equivalent to the base body attitude difference, and the previous desired position and attitude is calculated as the estimated value of the position and attitude difference on the to-be-moved foot 13 or the to-be-supported foot 13.

Further, in the foregoing embodiment, the desired position/attitude of the to-be-supported hand 23 supported by the structure has not been corrected in the leg link movement climbing up or down motion, the arm link movement climbing up or down motion, or the leg link and arm link movement climbing up or down motion. Alternatively, however, such an additional correction may be made on the basis of, for example, the to-be-supported foot position and attitude difference or the to-be-moved hand position and attitude difference.

Further, in the foregoing embodiment, the humanoid robot having two leg links 3, 3 and the arm links 4, 4 as the movable links has been described as an example of the robot 1. However, the present invention can be applied to a variety of types of robots. The present invention can be also applied to, for example, a robot provided with three or more movable links that function as leg links when traveling on a flat ground, or a robot provided with three or more arm links.

What is claimed is:

1. A mobile robot, which has a base body, a plurality of movable links extended from the base body, joints respectively provided between a distal end portion of each of the movable links and the base body, and an attitude sensor which detects an attitude of the base body, the mobile robot being configured such that the distal end portion of each of the movable links is moved with respect to the base body by a motion of the respective joint, the mobile robot further including a controller, the controller comprising a processor and a memory, the memory having a program installed thereon that, when executed by the processor, causes the controller to function as:

a motion target determining unit, which sequentially determines, in the case where the mobile robot climbs up or down a structure to be climbed up or down, a motion target that defines the motion of each joint of the mobile robot so as to include a climbing up and down motion in which distal end portions of upper movable links to be supported, which are one or more movable links extended from an upper portion of the base body among the plurality of movable links, and distal end portions of lower movable links to be supported, which are one or more movable links extended from a lower portion of the base body, are brought into contact with the structure thereby to be supported, and in a state wherein distal end portions of movable links to be moved, which are one or more movable links other than the upper movable links to be supported and the lower movable links to be supported, are positioned away from the structure, the distal end portion of each of the movable links to be moved is moved toward a desired support position and attitude to bring the distal end portion of the movable link to be moved into contact with the structure at the desired support position and attitude thereby to be supported;

a joint control unit that controls the motion of each joint of the mobile robot according to the determined motion target; and a difference estimation unit which estimates, in the climbing up and down motion of the mobile robot, as actual position and attitude of at least one of the distal end portion of each of the lower movable links to be supported and the distal end portion of each of the movable links to be moved, the position and attitude of at least one of the distal end portion of each of the lower movable links to be supported of the mobile robot and the distal end portion of each of the movable links to be moved thereof which is obtained by virtually rotating the mobile robot of the motion target, using as a center of rotation, an action center point of overall load applied from the structure to the distal end portion of each of the upper movable links to be supported by a difference between a detection value of the attitude of the base body indicated by an output of the attitude sensor and a desired value of the attitude of the base body in the motion target, and the difference estimation unit outputs at least one of a first position and attitude difference and a second position and attitude difference, the first position and attitude difference being a difference between the estimated actual position and attitude of the distal end portion of each of one or more lower movable links to be supported in the climbing up and down motion of the mobile robot and the desired position and attitude of the distal end portion of the lower movable link to be supported in the motion target, the second position and attitude difference being a difference between the estimated actual position and attitude of the distal end portion of each of one or more movable links to be moved in the climbing up and down motion of the mobile robot and the desired position and attitude of the distal end portion of the movable link to be moved in the motion target;

wherein the motion target determining unit determines the motion target such that, at the time of sequentially determining the motion target in the climbing up and down motion of the mobile robot, at least one of desired relative position and attitude of the distal end portion of each of one or more lower movable links to be supported with respect to the base body and desired support position and attitude at which the distal end portion of each of one or more movable links to be moved is to be supported by the structure is adjusted according to at least one of the first position and attitude difference and the second position and attitude difference.

2. The mobile robot according to claim 1, wherein the mobile robot has two or more movable links extended from the lower portion of the base body and two or more movable links extended from the upper portion of the base body, and the climbing up and down motion is a climbing up and down motion in which some movable links among the movable links extended from the lower portion of the base body are defined as the lower movable links to be supported, the remaining movable links among the movable links extended from the lower portion of the base body are defined as the movable links to be moved, and at least one movable link among the movable links extended from the upper portion of the base body is defined as the upper movable link to be supported, and the distal end portions of the movable links to be moved are moved.

3. The mobile robot according to claim 2, wherein the motion target determining unit is configured such that, in the case where the estimated position and attitude difference is a difference caused by the attitude of the base body inclined to bring the lower portion of the base body close to the structure, the desired relative position/attitude of the distal end portion of the lower movable link to be supported with respect to the base body is adjusted such that a distance between a part of each of one or more lower movable links to be supported among the movable links extended from the lower portion of the base body, which part being connected to the base body, and the distal end portion of the lower movable link to be supported is longer than that in the case where the position and attitude difference is zero, and the desired support position/attitude of the distal end portion of each of the one or more movable links to be moved among the movable links extended from the lower portion of the base body are adjusted such that the desired support position/attitude are brought closer to the base body than in the case where the position and attitude difference is zero.

* * * * *